Dec. 22, 1959   J. A. TERNISIEN ET AL   2,918,563
WELDING DEVICES FOR METALLIC PIECES
Filed June 24, 1957

United States Patent Office 2,918,563
Patented Dec. 22, 1959

2,918,563

WELDING DEVICES FOR METALLIC PIECES

Jean A. Ternisien, La Celle St. Cloud, and Michel Dupont, Paris, France, assignors to Trefileries et Laminoirs de Precision Gilby-Fodor (Societe Anonyme), Seine-&-Oise, France, a French company Application June 24, 1957, Serial No. 667,495

Claims priority, application France July 5, 1956

5 Claims. (Cl. 219—74)

Welding of some metals or alloys present difficulties because these metals can absorb some gases at temperatures lower than their melting point.

For instance, titanium, zirconium, beryllium, rhenium and their alloys, some stainless steels can adsorb steam, nitrogen, hydrogen and oxygen. Since these gases are normally present in the atmosphere they contaminate the parts to be welded.

It is known that to avoid contamination an air-tight chamber is used wherein the parts to be welded and the welding devices are placed. Air is pumped out of the chamber and replaced by a gas such as argon, helium or any other inert gas in a pure condition.

In such a fully air-tight chamber, the welds produced are satisfactory. They have the metallic glaze and the required mechanical properties for shaping and in particular for later drawings.

It is obvious that to produce welds on long pieces, such as welds for the manufacture of welded tubes which must then be drawn, the air tight chamber is difficult to install and its operating cost is high.

The present invention pertains to a welding device which has not the disadvantages of the air-tight chamber in regard to headroom, operating difficulties and discontinuities resulting from opening, closing, draining and introduction of gases preceding, going along, or following the weld itself.

According to the present invention, a welding device for metallic pieces liable to adsorb at a temperature lower than the melting point some gases contained in the atmosphere, comprises a chamber placed in the neighborhood of the piece to be welded and opened within the direction of said piece, a shell pervious to gases closing the said chamber and providing an open space wherein the said piece to be welded is placed, a permeable material liable to adsorb the gases between the said chamber and the said shell, means to heat the piece within the center part of the permeable shell and means to send between said piece and said shell a protective gas having no physical or chemical affinity for the metallic piece.

The following description along with the attached drawing, given as a non restrictive example, will make understood how said invention can be achieved. It is understood that the particularities dependent on either the text or drawing are part of said invention.

As an example, the piece to be welded will be a tube and welding is done with a fusible electrode.

Figure 1:
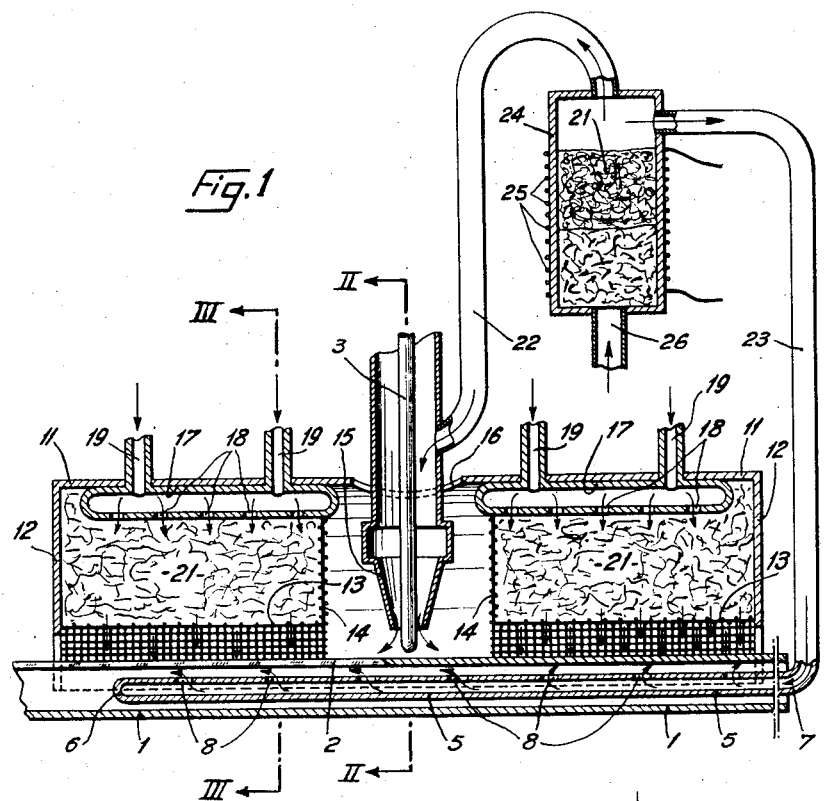
Fig. 1 is a cross-section along the middle vertical plane of the tube to be welded.
Figure 2:
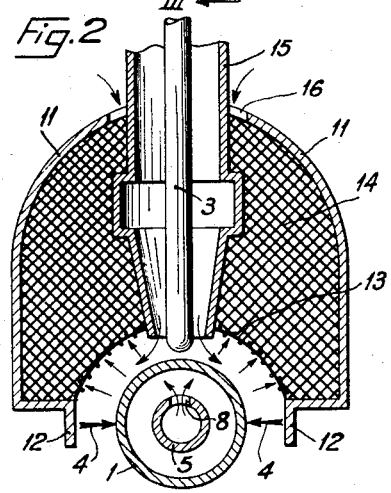
Figs. 2 and 3 are cross-sections along II—II and III—III of Fig. 1.

The tube 1 is placed horizontally with at its upper part the slot 2 to be welded which is kept closed, at least within the welding area, in front of the electrode 3, by side stresses schematized by the arrows 4 and produced by well known means which are not represented here for simplifying the diagrams.

Inside the tube 1, a tube 5 is placed with one of its ends 6 closed. The tube 5 is drilled with holes 8 which are facing the weld seam 2.

This tube is fed, at its end 7, with purified argon.

The tube 1 can be at its ends, at least the end where welding started, more or less closed by any temporary means so its inside is without air, the latter being replaced by argon.

Above the tube 1, a chamber or envelope is placed comprising an outer cylindrical shell with a reversed U shape cross-section the lower parts 12 of which being smaller and approaching on the side and in a parallel direction to the tube 1, down to a level lower than its horizontal diametral plane, for instance.

The length of this chamber corresponds to the length of the area to be protected by the argon atmosphere.

It is closed at its ends by in-cut plain walls for passage of tube 1 and along its length, underneath, by a wire arch 13 broken off in the middle by the walls 14, made of wire-netting also, around the nozzle 15, surrounding the electrode 3, which goes through a hole 16, inside the chamber 11, between the walls 14.

Between the ends 12 and the walls 14, horizontal tubes 17 drilled with holes 18 and closed at their ends are placed, air-tight, with their feeding tubes 19 going through the chamber 11.

A catalytic and adsorbing mixture 21 is placed within the spaces between the chamber 11, the arch 13 and the walls 12 and 14.

The feeding tubes 19 are connected, through pipes, to a source of industrial argon (not shown).

The nozzle 15 surrounding the electrode and the end 7 of the tube 5 are respectively connected through tubes 22 and 23 to an enclosed capacity which can be, for instance, heated by an electrical resistor 25 and filled with the mixture 21, or with any other mixture giving the same results, through which industrial argon is fed through a tube 26 to be purified and to go out through tubes 22 and 23.

On the diagrams, spaces between tube 1 and wire arch 13 and between nozzle 15 and side walls 12 are exaggerated for clearness of purpose, in fact, they are somewhat smaller, just to comply with easy passages of the tube 1 and nozzle 15.

As mixture 21, for instance, fine divided titanium can be used, but its catalytic activity is good only above 700° C.

Without being limited by the following examples, the following products, mixed or made of several layers, can be used.

(1) Activated carbon for adsorption of nitrogen;

(2) Asbestos packing treated with the Ternisien-Melot mixed solution such as described in the following literature:

J. Ternisien and H. F. Melot: "Recherche sur la catalyse d'oxydation" (Chimie et Industrie, volume 57, January 1947, No. 1).

J. Ternisien: "La catalyse d'oxydation et la combustion sans flamme" (La technique moderne, volume XIII, 1er et 15 Septembre 1950, Nos. 17 et 18).

The Ternisien-Melot solution consists fundamentally in, at least two metals, one being platinum.

Such treated asbestos complies at the same time with combined oxydation and hydrogenation.

Operation is as follows: argon is purified inside the capacity 24, through the mixture 21; it goes out through the holes 8 of the tube 5 and flush out the air of the tube 1, at least in a satisfactory manner around the hot parts.

Through the nozzle 15, it produces around the weld, in front of the electrode 3, a pure argon atmosphere which protects this weld.

The industrial argon coming from the tubes 17 diffuses out inside the catalytic material 21 wherein it is purified and the purified argon coming from the wire-netting of the arch 13 around the tube to be welded 1 and around the nozzle 15, is producing an argon atmosphere by displacing the air and by preventing it to come back through the spaces communicating with the atmosphere.

This flush of air and moisture or any other gaseous impurities is completed by the adsorption through the surfaces of the catalytic agent shown close to the tube 1, for instance, and very permeable through the wire-netting, on rather large areas. This adsorption suffices to create a flow, ruled by the laws of the chemical kinematics, which purifies the argon atmosphere by soaking the molten bath of welding and the hot parts around and behind the point where this weld is performed.

Figure 3:
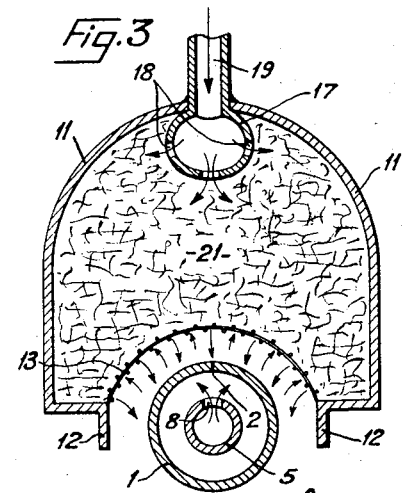

There is, therefore, as shown in Fig. 3 by opposite arrows, a motion of gaseous molecules between the piece and the permeable shell. The detrimental molecules are expelled from the metal and fixed on the adsorbing material, on the one hand, because this material has a greater affinity for these molecules than the metal itself (preferential effect), on the other hand, because its adsorbing area is greater than the one of the metal (skin effect).

The fact that the chamber, and the devices connected to to it, are not enclosed, permits, of course, a quick placing and removal of the tubes to be welded and an easy movement of these tubes in front of the electrode by longitudinal motion at determined speed between strain-rollers, for instance, closing the slot to be welded within the welding area (not shown as being a well known device). Of course, it is also possible to move the chamber and the electrode on a fixed tube, instead of moving the tube under the fixed chamber. The only differences will be the servitudes resulting from the argon feeding pipes, for instance.

Instead of argon, any other inert gas such as helium, or gaseous mixture can be used without departing from the scope of this invention.

The tube to be welded can be made of titanium, zirconium, beryllium, rhenium or alloys of these metals. It can also be made of stainless steel, in particular stainless steel of the type 18/8 containing 18% of chromium, 8% of nickel with or without molybdenum or titanium. Welding of such a stainless steel is usually made inside a stream of protective gas, but the purity of which cannot be complete because the protective gas carries along ambient air and therefore detrimental gases. These gases give defects in the weld, the more important as the welding speed is greater. The use of the embodiment described in the present invention permits to increase the welding speed and to produce sound welds without any cracks or defects.

Of course, the shape of the embodiment can be adapted to the shape of the pieces to be welded.

Welding can be made, not only by fusible electrode, but also by arc-welding, resistance welding, induction welding or any other means producing a localized fusion.

What we claim is:

1. A welding device for metallic piece liable to absorb gases contained in the atmosphere at a temperature lower than their melting point, comprising in combination, a chamber having an open face, a shell pervious to gases extending over said face and closing the said chamber and formed to provide a cavity wherein a piece to be welded may be placed, said piece being at least partially surrounded by said shell, a permeable gas absorbing material interposed between said chamber and said shell, means for heating said piece within the cavity and means for introducing into said cavity, between said piece and said shell, a protective gas, inert with respect to said piece.

2. The combination of claim 1, wherein said last means comprises a piping means for introducing said protective gas between said chamber and shell.

3. The combination of claim 1, wherein said permeable gas absorbing material comprises actuated coal and asbestos treated with a solution containing platinum and at least another metal.

4. The combination of claim 1, wherein said means for introducing a protective gas comprises a piping means passing through said chamber and shell and opening into said cavity, the said piping means including a receptacle containing a gas absorbing material and means being provided for heating said receptacle.

5. The combination of claim 1, wherein said permeable shell is made of wire netting.

References Cited in the file of this patent

UNITED STATES PATENTS

| | | |
|---|---|---|
| 1,749,765 | Hendrickson | Mar. 11, 1930 |
| 2,053,417 | Brace | Sept. 8, 1936 |
| 2,583,362 | Dunn | Jan. 22, 1952 |
| 2,649,527 | Chapman | Aug. 18, 1953 |
| 2,747,066 | Brace | May 22, 1956 |
| 2,834,870 | Platte | May 13, 1958 |